(12) United States Patent
Martin et al.

(10) Patent No.: US 7,353,303 B2
(45) Date of Patent: Apr. 1, 2008

(54) TIME SLOT MEMORY MANAGEMENT IN A SWITCH HAVING BACK END MEMORIES STORED EQUAL-SIZE FRAME PORTIONS IN STRIPES

(75) Inventors: Kreg A. Martin, Los Gatos, CA (US); Ronald K. Kreuzenstein, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 999 days.

(21) Appl. No.: 10/658,900

(22) Filed: Sep. 10, 2003

(65) Prior Publication Data
US 2005/0052920 A1    Mar. 10, 2005

(51) Int. Cl.
*G06F 3/00* (2006.01)
(52) U.S. Cl. .......................................... 710/53; 710/52

(58) Field of Classification Search ................ 370/379, 370/395.7, 352, 406, 392; 714/782; 718/100; 710/52, 53
See application file for complete search history.

(56) References Cited

U.S. PATENT DOCUMENTS

| 6,917,614 | B1* | 7/2005 | Laubach et al. | 370/392 |
| 6,983,414 | B1* | 1/2006 | Duschatko et al. | 714/782 |
| 7,181,485 | B1* | 2/2007 | Lau et al. | 718/100 |
| 2002/0101860 | A1* | 8/2002 | Thornton et al. | 370/352 |
| 2002/0154646 | A1* | 10/2002 | Dubois et al. | 370/406 |

* cited by examiner

*Primary Examiner*—Le Hien Luu
(74) *Attorney, Agent, or Firm*—Conley Rose, P.C.

(57) ABSTRACT

A switch comprising front-end and back-end application specific integrated circuits (ASICs) is disclosed. Frame storage and retrieval in the switch is achieved by dividing a frame into equal sized portions that are sequentially stored in switch memory during an assigned time slot. Control logic coupled to the front-end and back-end ASICs assigns the time slot either dynamically or statically.

43 Claims, 5 Drawing Sheets

| DWELL TIME | | | | | | | | | | | |
|---|---|---|---|---|---|---|---|---|---|---|---|
| UPLINK | 0 | 1 | 2 | 3 | 4 | 5 | 6 | 7 | 8 | 9 | 10 |
| 302 | TS0 | TS1 | TS2 | TS3 | TS4 | TS5 | TS6 | TS7 | TS8 | | |
| 304 | | TS0 | TS1 | TS2 | TS3 | TS4 | TS5 | TS6 | TS7 | TS8 | |
| ... | | | TS0 | TS1 | TS2 | TS3 | TS4 | TS5 | TS6 | TS7 | TS8 |
| ... | TS8 | | | TS0 | TS1 | TS2 | TS3 | TS4 | TS5 | TS6 | TS7 |
| ... | TS7 | TS8 | | | TS0 | TS1 | TS2 | TS3 | TS4 | TS5 | TS6 |
| ... | TS6 | TS7 | TS8 | | | TS0 | TS1 | TS2 | TS3 | TS4 | TS5 |
| ... | TS5 | TS6 | TS7 | TS8 | | | TS0 | TS1 | TS2 | TS3 | TS4 |
| ... | TS4 | TS5 | TS6 | TS7 | TS8 | | | TS0 | TS1 | TS2 | TS3 |
| ... | TS3 | TS4 | TS5 | TS6 | TS7 | TS8 | | | TS0 | TS1 | TS2 |
| 306 | TS2 | TS3 | TS4 | TS5 | TS6 | TS7 | TS8 | | | TS0 | TS1 |
| 308 | TS1 | TS2 | TS3 | TS4 | TS5 | TS6 | TS7 | TS8 | | | TS0 |

FIGURE 4

| DOWNLINK | DWELL TIME | | | | | | | | | | |
|---|---|---|---|---|---|---|---|---|---|---|---|
| | 0 | 1 | 2 | 3 | 4 | 5 | 6 | 7 | 8 | 9 | 10 |
| 302 | TS0 | TS1 | TS2 | TS3 | TS4 | TS5 | TS6 | TS7 | TS8 | TS9 | TS10 |
| 304 | TS10 | TS0 | TS1 | TS2 | TS3 | TS4 | TS5 | TS6 | TS7 | TS8 | TS9 |
| ... | TS9 | TS10 | TS0 | TS1 | TS2 | TS3 | TS4 | TS5 | TS6 | TS7 | TS8 |
| ... | TS8 | TS9 | TS10 | TS0 | TS1 | TS2 | TS3 | TS4 | TS5 | TS6 | TS7 |
| ... | TS7 | TS8 | TS9 | TS10 | TS0 | TS1 | TS2 | TS3 | TS4 | TS5 | TS6 |
| ... | TS6 | TS7 | TS8 | TS9 | TS10 | TS0 | TS1 | TS2 | TS3 | TS4 | TS5 |
| ... | TS5 | TS6 | TS7 | TS8 | TS9 | TS10 | TS0 | TS1 | TS2 | TS3 | TS4 |
| ... | TS4 | TS5 | TS6 | TS7 | TS8 | TS9 | TS10 | TS0 | TS1 | TS2 | TS3 |
| ... | TS3 | TS4 | TS5 | TS6 | TS7 | TS8 | TS9 | TS10 | TS0 | TS1 | TS2 |
| 306 | TS2 | TS3 | TS4 | TS5 | TS6 | TS7 | TS8 | TS9 | TS10 | TS0 | TS1 |
| 308 | TS1 | TS2 | TS3 | TS4 | TS5 | TS6 | TS7 | TS8 | TS9 | TS10 | TS0 |

| UPLINK | | | DOWNLINK | | |
|---|---|---|---|---|---|
| TIMESLOT | STATUS | POSITION | TIMESLOT | STATUS | POSITION |
| TS0 | ACTIVE | 0 | TS0 | ACTIVE | 0 |
| | | | TS1 | ACTIVE | 10 |
| TS1 | ACTIVE | 10 | TS2 | ACTIVE | 9 |
| | | | TS3 | ACTIVE | 8 |
| TS2 | ACTIVE | 9 | TS4 | IDLE | 7 |
| | | | TS5 | ACTIVE | 6 |
| TS3 | IDLE | 8 | TS6 | ACTIVE | 5 |
| | | | TS7 | IDLE | 4 |
| TS4 | ACTIVE | 7 | TS8 | IDLE | 3 |
| TS5 | IDLE | 6 | TS9 | ACTIVE | 2 |
| TS6 | ACTIVE | 5 | TS10 | ACTIVE | 1 |
| TS7 | ACTIVE | 4 | | | |
| TS8 | ACTIVE | 3 | | | |

FIGURE 7

TIME SLOT MEMORY MANAGEMENT IN A SWITCH HAVING BACK END MEMORIES STORED EQUAL-SIZE FRAME PORTIONS IN STRIPES

BACKGROUND

Computer networks may facilitate communication by establishing links between nodes (e.g. computer, server, and stand-alone peripheral) of a network. These links may be physical or logical paths from a sender of a piece of information to its receiver. Each node of a network depends upon these links to communicate with other nodes. The information may be communicated in the form of data blocks, commonly referred to as frames.

Due to the growing number of nodes in networks, it is often impractical to directly connect every pair of sender-receiver nodes with a direct link. Consequently, many networks include switches for routing frames through shared intermediate links. Each switch may include multiple ports through which frames enter and exit the switch on network links. The switch is responsible for routing frames onto links that transport the frames closer to their destination. Each switch may be simultaneously routing frames from multiple nodes through multiple links of the network.

High bandwidth switches may utilize 256 or more ports to handle large amounts of data from numerous connected switches. Frames may be received from a connected switch through an external switch port and then placed into switch memory. In order to ensure coherency of the data stored in switch memory, only one port may have access to any given memory unit at any given time. Since multiple ports may need to access identical memory units to transfer a common frame from switch memory, memory delays may occur. These delays may increase the time it takes for data to travel from its source to its destination in the network, referred to as latency. A memory architecture that prevents such delays would be desirable.

SUMMARY

A switch having time slot memory management is disclosed. Frame storage and retrieval in the switch is achieved by dividing a frame into equal sized portions that are sequentially stored in back-end circuits. Front-end circuits interface to the ports through which frames are transmitted and received. Internal links exist from each of the front-end circuits to each of the back-end circuits, and the internal links have time slots that are staggered in time between adjacent internal

BRIEF DESCRIPTION OF THE DRAWINGS

A better understanding of the disclosed systems and methods may be obtained in conjunction with the following drawings, in which:

FIG. 4 illustrates a distribution of time slots associated with uplinks in accordance with preferred embodiments;

FIG. 7 illustrates a exemplary time slot table in accordance with preferred embodiments.

Figure 1:
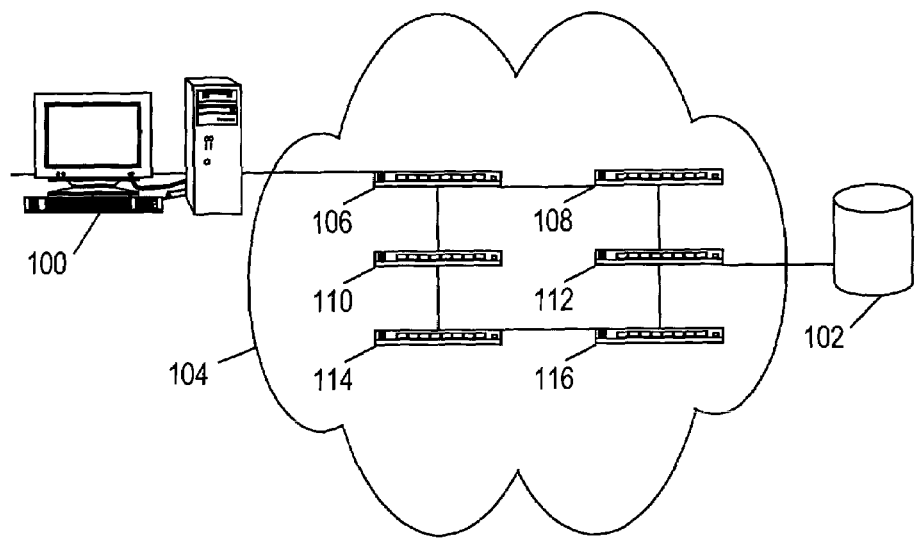
FIG. 1 illustrates an exemplary Fibre Channel (FC) network in accordance with preferred embodiments.

While the invention is susceptible to various modifications and alternative forms, embodiments of the invention are shown by way of example in the drawings and described herein. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular components and systems. Different companies may refer to components by different names. This document does not intend to distinguish between components and systems that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

FIG. 1 illustrates a computer system 100 coupled to a storage device 102 by a Fibre Channel (FC) network 104. The FC network protocol defines standard media and signaling conventions for transporting data in a serial fashion. A single FC link can carry data at rates exceeding 2 gigabits per second (Gb/s) in both directions simultaneously. Each link can utilize numerous virtual channels (VCs) to prevent blocking and to ensure high throughput. The FC protocol also provides an error detecting code and a frame structure for transporting the data. Further, the FC protocol sets out a credit-based flow control methodology, and creates some common services to allow proper routing of data (e.g. fabric controller, name server). The computer system 100 may be any suitable node device including a desktop computer, a server, or a user terminal. Storage device 102 may similarly be any suitable node device including a hard drive, RAID array, or network data store. FC network 104 is shown having six switches 106, 108, 110, 112, 114, and 116 coupled together via inter-switch links (ISLs). The switches may have as few as four and as many as 256 or more ports. In accordance with preferred embodiments, centralized memory architecture (CMA), may be employed in one or more switches in FC network 104.

Figure 2:
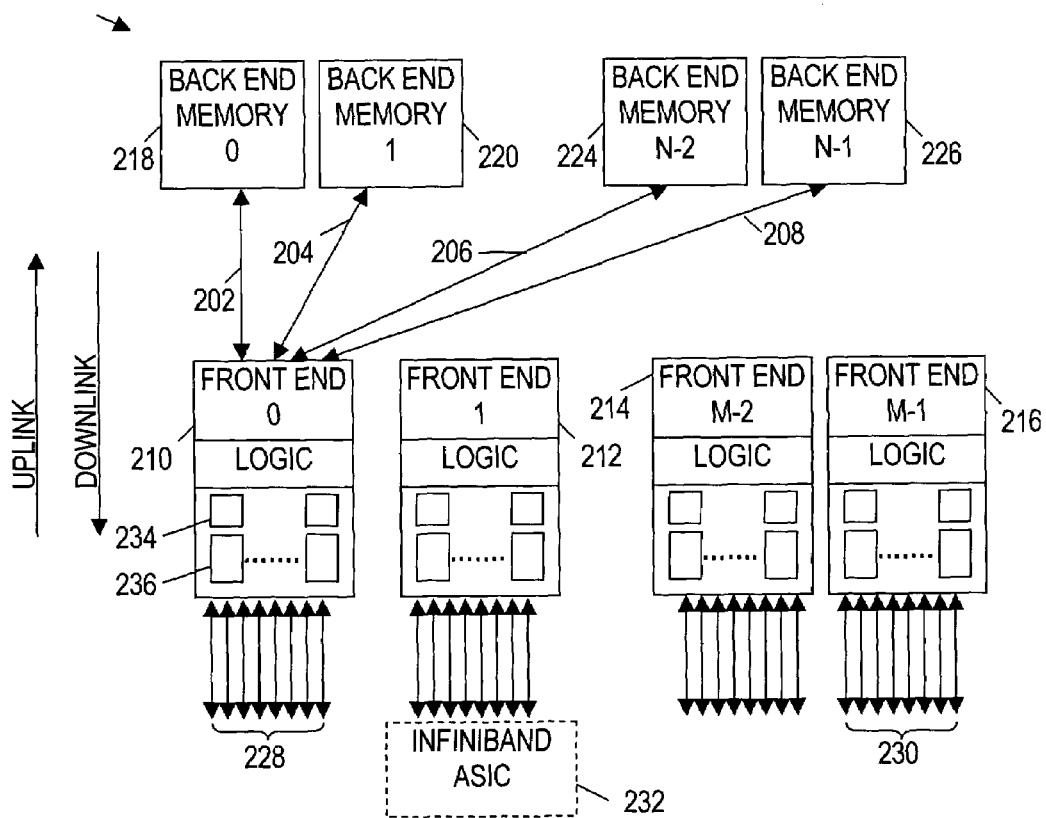
FIG. 2 illustrates a generic FC switch in accordance with preferred embodiments.

FIG. 2 illustrates a block diagram of a CMA based switch 200 in accordance with preferred embodiments. CMA may be used to support a variety of switch protocols (e.g. Fibre Channel, InfiniBand) and a variety of switch configurations (e.g. 256 port, non-blocking). To support a variety of switch types and configurations, two types of application specific integrated circuits (ASICs), "front-end" and "back-end, preferably are utilized. Front-end ASICs provide the connection hardware for the external ports and back-end ASICs provide the memory for the switch.

Switch 200 may comprise N back-end ASICs and M front-end ASICs. Physical or logical connections, referred to as "internal links", preferably connect front-end and back-end ASICs. Internal links 202, 204, 206, and 208 may connect front-end ASICs 210, 212, 214, and 216 to back-end ASICs 218, 220, 224, and 226. Although not explicitly shown in FIG. 2, each front end ASIC 210, 212, 214, and 216 may have an internal link to each back-end ASIC 218, 220, 224, and 226. Therefore, each front-end ASIC 210, 212, 214, and 216 may possess N internal links to back-end ASICs. Correspondingly, each back-end ASIC 218, 220, 224, and 226 may posses M internal links to front-end ASICs. Each internal link may consist of a pair of serial, unidirectional signals. A signal that carries information from a front-end ASIC to a back-end ASIC may be referred to as an "uplink". Conversely, a signal that carries information from a back-end ASIC to a front-end ASIC may be referred to as a "downlink".

Back-end ASICs in switch 200 may provide storage for frames, intra-switch messages, and shared tables (e.g. the routing table). In addition, back-end ASICs preferably perform an integral role in implementing the switching functions associated with the switch. For simplification purposes, each back-end ASIC 218, 220, 224, and 226 may be considered a multi-port random access memory (RAM). As such, they provide protocol independent means for storing data. Each back-end ASIC contains one or more internal RAM modules. Each chip has a defined capacity (e.g. 2 MB) for storing data. In addition, the memory within a back-end ASIC may be split into functional "RAM groups". The architect of a CMA based switch may determine the configuration of the RAM, including grouping, based upon the memory requirements of the switch. The collective memory associated with the back-end ASICs, split on a chip basis into RAM groups, may be referred to as the "central memory" of a CMA switch.

Each front-end ASIC 210, 212, 214, and 216 in switch 200 preferably contains external connection hardware, referred to as "external ports". These external ports are the mechanism by which data is sent into and out of the switch. Although the switch architect may employ any number of such ports, eight external ports preferably are included in each front-end ASIC in switch 200. Accordingly, front-end ASIC 210 and 216 each possess a group of eight external ports 228 and 230 respectively.

Each front-end ASIC 210, 212, 214, and 216 preferably supports various external protocols as discussed above through the use of additional ASICs. These ASICs may be designed to convert the desired protocol to the switch default FC protocol. The additional ASICs preferably are externally attached to a CMA based switch through the external ports of the switch. For example, additional ASIC 232 may be attached to front-end ASIC 212 to convert the Infinband protocol to the FC protocol. In alternative embodiments, the additional ASICs may replace a front-end ASIC.

A frame enters and exits switch 200 through the external ports associated with a front-end ASIC. The front-end ASIC a frame enters a switch on may be referred to as the "entry ASIC". Correspondingly, the front-end ASIC a frame exits a switch on may be referred to as the "exit ASIC". To facilitate the entry and exit of frames, two sets of control logic, referred to as "ingress" logic and "egress" logic, are preferably included in each front-end ASIC 210, 212, 214, and 216 (shown as "LOGIC").

Ingress logic may be responsible for controlling data flow into the switch from external ports. The functionality of the ingress logic allows frames to be received by external ports and stored into switch memory, with a high-level control message referred to as a "PUT" message being sent after the frame has started to be stored into the switch memory. The PUT message is sent from the entry ASIC to the exit ASIC and contains the address in memory where the frames resides.

The ingress logic also preferably determines the exit ASIC of a frame. The exit ASIC is determined by examining a routing table preferably stored in switch memory. This routing table associates a frame destination address with a particular external port. When a frame is received by switch 200, the destination address in the frame header is examined against the routing table to determine the exit ASIC associated with the identified port. Lastly, ingress logic may be responsible for receiving a "FINISH" message and managing the corresponding buffer space in switch memory. The FINISH message indicates that the exit ASIC has successfully transferred a frame from switch memory. The memory and buffer space associated with the frame may be freed to facilitate the storing of other frames that are received.

Egress logic coupled to each front-end ASIC 210, 212, 214, and 216 is responsible for controlling data flow from switch memory to external ports. The egress logic receives PUT messages from the ingress logic and acquires the necessary resources for the transfer. In addition, egress logic preferably is responsible for reading frames from switch memory and transmitting the frames to their respective exit ports. The egress logic associated with a front-end ASIC also may send a FINISH message to ingress logic when a frame has been read from switch memory. Ingress and egress logic may utilize PUT and FINISH messages to control the high-level data flow in a CMA switch. Collectively, PUT and FINISH messages may be referred to as "intra-switch messages".

At least one back-end ASIC in switch 200 may be dedicated to storing and forwarding intra-switch messages. For example, back-end ASIC 226 in switch 200 may store a PUT message from a front-end ASIC's ingress logic and obtain the necessary resources. The PUT message then may be forwarded to the exit ASIC. In addition, the back-end ASIC 226 may forward a FINISH message from the exit ASIC's egress logic to the entry ASIC's ingress logic. The entry ASIC's ingress logic then frees the associated buffer space and memory. The other back-end ASICs 218, 220, and 224 preferably are dedicated to storing frames.

In order to facilitate the use of high-layer external protocols previously discussed, the internal links may use a common low-level protocol. This low-level protocol preferably is independent of external protocols. Thus, this low-level protocol may permit a CMA based switch to support multiple external-port protocols while utilizing an identical set of back-end ASICs. In fact, multiple external protocols may be supported simultaneously in a CMA switch. The multiple protocol support allows CMA switches to be versatile, handling numerous types of transfers simultaneously.

While the high-level functions (e.g. setting up a transfer) in switch 200 are controlled by intra-switch messages (i.e. PUT and FINISH messages), the type of data sent through an internal link controls low-level functions (e.g. word storage, byte word retrieval). Four types of data, write addresses, write data, read addresses, and read data are utilized to control the low-level functions performed by back-end and front-end ASICs.

When a frame is being received on an external port of switch 200, portions of the frame are placed into a temporary storage location referred to as a "receive data buffer". Each external port preferably is coupled to a unique receive data buffer. Each receive data buffer is preceded by another temporary storage location referred to as "receive address buffer". The receive address buffer may contain the write address in central memory the associated data may be stored in. Accordingly, front-end ASIC 210 may possess a receive data buffer 236 and a receive address buffer 234 associated with a port in external port group 228. The receive data and address buffers preferably take the form of first-in-first-out (FIFO) data structure.

Before being sent on an uplink, the data in the receive data slot is converted to write data and this write data along with a write address is sent on the appropriate uplink. When a back-end ASIC receives the write data and the write address, the back-end ASIC stores the write data at the designated write address. Correspondingly, when a read address is received by a back-end ASIC, the data located at the indicated read address is transferred to the port of the front-end ASIC that sent the read address. The data sent through the downlinks is in the form of read data. Means for recognizing the three types of data may be employed though a unique identifier in the data itself or through a data format that uniquely corresponds to a respective data type.

In order to permit multiple ports access to a frame in central memory simultaneously, the CMA based switch 200 divides the frame into chucks, referred to as "dwells". In accordance with preferred embodiments, dwells are five-word portion of a frame. Each dwell may be written to a back-end ASIC in a sequential fashion. For example, the first dwell of a frame may be store in back-end ASIC 218. The second dwell of the frame may be stored into back-end ASIC 220, and so on. This process of storing dwells of a frame into sequential back-end ASICs may be referred to as "striping". After the frame is striped across all back end-ASICs, the frame may continue to stripe data in a sequential manner into back-end ASICs previously utilized, but in a different memory location, referred to as a "buffer line". The process may continue to cycle through the back-end ASICs until the frame is completely stored into central memory. Depending upon the frame size, multiple buffer lines may be utilized to store the frame.

Since the frame is striped across the back-end ASICs, a frame may start to be retrieved from central memory before it is completely stored into central memory. Referring again to FIG. 2, consider a frame received on a port in external port group 228. Once a dwell-sized portion of the frame is received, front-end ASIC 210 may send the dwell in the form of write data and a write address through uplink 202. While the first dwell of the frame is being stored into back-end ASIC 218 of central memory, the frame may continue to be received on the port in external port group 228. Once the second dwell is received, the corresponding write data and write address may be sent to back-end ASIC 220 through uplink 204. This process may continue until the frame is completely stored into central memory. After all N back-end ASICs have a dwell of the frame stored, new buffer lines may be used until the frame is completely stored in central memory. The frame may start to be retrieved from memory by the exit ASIC anytime after the first dwell has been stored into central memory. The exit ASIC retrieves the dwells of the frame and preferably reassembles the frame before transmission.

Referring again to FIG. 2, switch 200 may be customized depending upon the variables N and M. For exemplary purposes, 32 front-end ASICs may be utilized. The quantity M may therefore be 32, indicating that a total of 32 front-end ASICs are utilized in the switch design. The quantity N may be 11, indicating that a total of 11 back-end ASICs are utilized for storage. Each one of the 32 front-end ASICs may have a group of eight external ports. The above configuration may result in a 256 port CMA based switch.

Figure 3:
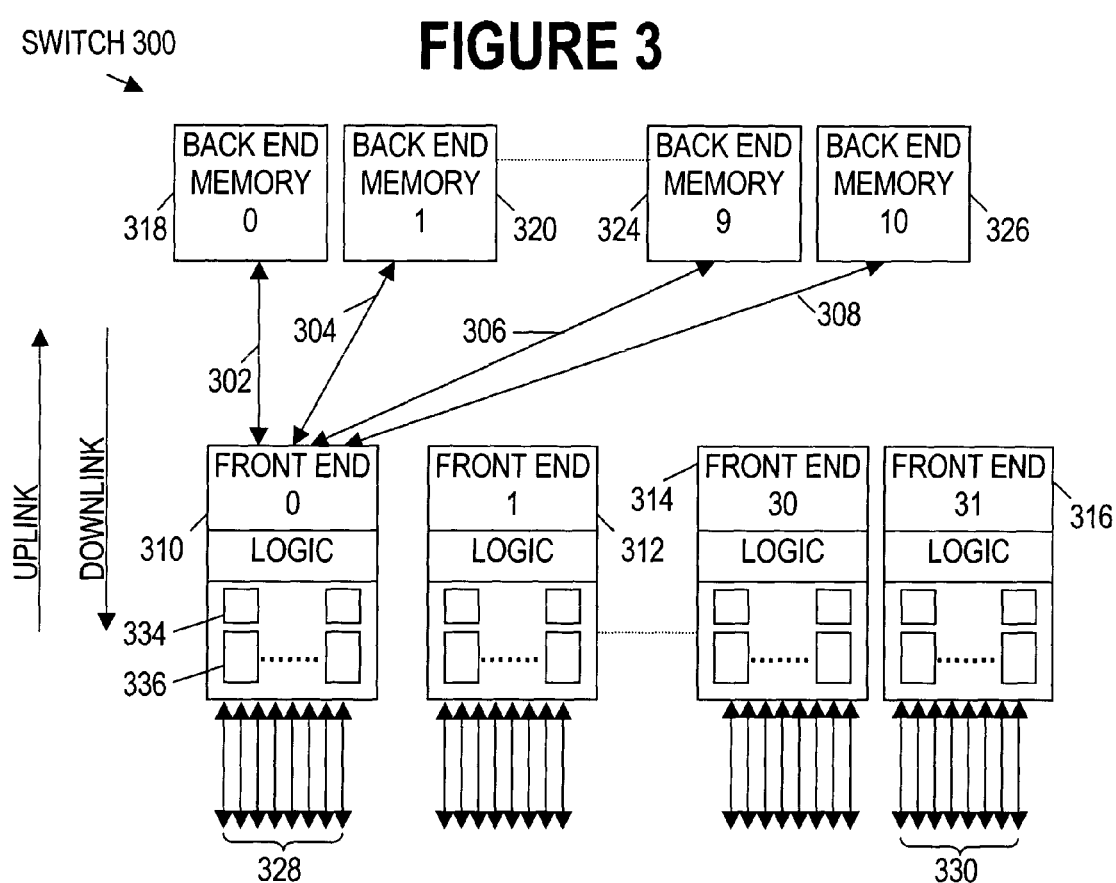
FIG. 3 illustrates a FC switch in accordance with preferred embodiments.

Referring now to FIG. 3, a 256 port CMA switch is illustrated. Four of the 11 back-end ASICs 318, 320, 324, and 326 are shown. Four of the 32 front-end ASICs 310, 312, 314, 316 are shown. Internal links 302, 304, 306, and 308 may connect front-end ASICs 310, 312, 314, 316 to back-end ASICs 318, 320, 324, and 326 respectively. Although normally at least one back-end ASIC may be reserved for intra-switch messages, for simplification purposes all back-end ASICs in switch 300 are utilized for storing frames. This exemplary switch is used in the following discussion of the information streams in a CMA based switch.

Although a specific configuration of back-end and front-end ASICs is used in the following discussion, other configurations may be similarly used. For example, a base switch may be constructed from one front-end and one back-end ASIC, resulting in 8 ports. All internal links connect the front-end ASIC to the back-end ASIC. A 32 port switch may be constructed from four front-end ASICs and two back-end ASICs. Internal links connect the four front-end ASICs to each of the two back-end ASICs. Other configurations of 16, 48, 64, 128, and 512 or more ports may be similarly constructed by changing the number of front-end and back-end ASICs. Varying the ratio between the number of front-end and back-end ASICs can be used to change the amount of available buffer credit and hence the length of any links.

Other configurations may logically divide each back-end ASIC into two or more distinct, logical back-end ASICs. Each logical back-end ASIC may possess 16 or fewer internal ports. For example, a 128-external port switch may be configured by using 16 front-end ASICs, each with 8 external ports, and connecting two internal links from each front-end ASIC to each logical back-end ASIC.

In accordance with certain preferred embodiments, the uplink and downlink information streams to and from central memory may be partitioned into fixed time slots during which data may be transferred. Although any number of time slots may be chosen by the CMA switch architect, nine time slots preferably may be associated with the uplinks and eleven time slots may be associated with the downlinks of each front-end ASIC in switch 300. Each time slot preferably transfers a dwell-sized portion of data through an internal link and then switches to the next sequential internal link. To facilitate discussion, a dwell-size of 5 words has been chosen. Therefore, time slots may reside, or "dwell", at an internal link for a time required to transfer 5 words of data.

The time slots may be independent of each other to allow nine different frames to be transferred through uplinks associated with each front-end ASIC concurrently. Similarly, eleven different frames may be transferred through downlinks associated with each front-end ASIC concurrently.

The alignment of uplink and downlink time slots preferably is staggered by one dwell time between adjacent internal links. For example, a time slot TS0 associated with uplink 302 in switch 300 may occur a dwell time before time slot TS0 occurs on uplink 304. Each time slot cycles through the internal links of a CMA switch. The time slots may wrap around from uplink 308 to uplink 302. Therefore, when a frame needs to be transferred to central memory through an uplink or from memory through a downlink, it may utilize a single time slot to carry out the transfer. The time slot will cycle through the back-end ASICs so that the frame striped in central memory can be accessed at the appropriate time.

FIG. 4 illustrates an exemplary layout of the uplinks in a front-end ASIC. The eleven uplinks 302-308 associated with front-end ASIC 310 are shown for next 10 dwell periods where dwell time 0 represents the current state of the time slots. The distribution of the nine uplink time slots TS0-TS8 is shown in the table. Each time slot TS0-TS8 uses the next sequential uplink at the next dwell period. For example TS0 utilizes uplink 302 during dwell time 0 and uplink 304 during dwell time 1. Since there are only nine uplink time slots and eleven uplinks, two uplinks preferably may be utilized to transfer read and write addresses as previously discussed. For example, at dwell time 8, uplinks 306 and 308 are not utilized as shown. In addition, since there are only eight external ports associated with each front-end ASICs and nine uplink time slots, the additional uplink time slot is reserved by switch 300 to handle "special" memory requests. These special memory requests may include high priority memory transfers (e.g. a frame for which there is no entry in the routing table). The additional time slot ensures that special memory requests are handled in an efficient fashion. For example, time slots TS0-TS7 may be utilized for external port group 328. Additional time slot TS8 may be utilized for special memory requests. When a special memory request is received, control logic may assign the extra uplink time slot to the frame. This control logic may be referred to as a "time slot manager".

Alternatively, the read addresses, the write addresses, and the write data may be transported through an uplink in more efficient patterns. For example, write addresses and read addresses may be mixed between dwells of frame data. Referring again to FIG. 4, this may result in a pattern that repeats every 55 words, where write and read addresses require one half of a word (16 bits) each.

Referring again to FIG. 3, when a frame comes into a port group 328, the first dwell of the frame may be placed into a receive data slot 336. The time slot statically assigned to the port that received the frame is utilized to transfer the frame to central memory. For example, assume TS0 from FIG. 4 is assigned to this port. The frame preferably may be transferred as soon as TS0 becomes free. For example, TS0 may become free at dwell time 1. According to the table in FIG. 4, uplink 304 is used to transfer the beginning of the frame. Thus, the beginning of the frame may be stored into back-end ASIC 320 (FIG. 3) at this time and a PUT message sent to the front-end ASIC that is to transmit the frame. The PUT message preferably contains a "SOF (Start of Frame) offset," which is the location in memory the start of the frame resides. The SOF offset includes a chip offset, which indicates the back-end ASIC that contains the start of the frame.

Figures 5, 6:
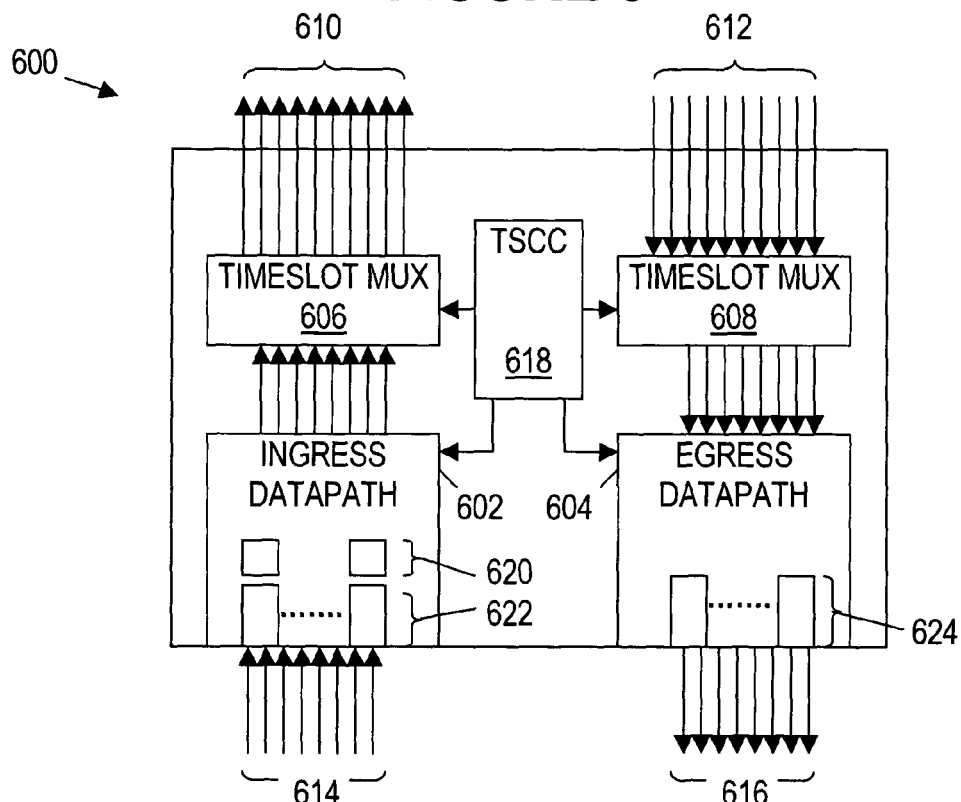
FIG. 5 illustrates a distribution of time slots associated with downlinks in accordance with preferred embodiments.
FIG. 6 illustrates a block diagram of a time slot manager in accordance with preferred embodiments.

FIG. 5 illustrates an exemplary layout of the time slots associated with the downlinks of a front-end ASIC. The eleven downlinks 302-308 associated with front-end ASIC 210 are shown for 11 dwell periods where dwell time 0 represents the current state of the time slots. The distribution of the eleven downlink time slots TS0-TS10 is also shown. Each time slot TS0-TS10 uses the next sequential uplink at the next dwell period. For example TS2 utilizes downlink 302 during dwell time 2 and uplink 304 during dwell time 3. Since there are eleven downlink time slots and eleven downlinks associated with a front-end ASIC, each downlink is always occupied by a time slot.

As opposed to the statically assigned uplink time slots, the downlink time slots are dynamically assigned by a time slot manager. When a frame is to be read from central memory, the time slot manager selects one of the eleven downlink time slots to transfer a frame from memory to a front-end ASIC. The process of dynamically choosing a downlink time slot for transfer of a frame may be referred to as "dynamic time slot selection".

Dynamic time slot selection makes use of a data structure referred to as a "Start of Frame offset" (SOF offset). The SOF offset is a location in central memory where a first dwell of a frame resides. The SOF offset may comprise a chip offset, a RAM group number, and a word offset. The chip offset identifies the particular RAM chip the start of frame may reside. The RAM group number designates which RAM group within the RAM chip the start of frame may reside. Lastly, the word offset defines the location from the beginning of a RAM group the start of frame resides. Although the word offset is configurable, the offset preferably is set to zero, indicating that the frame resides at the beginning of the dwell.

While a frame is being stored into central memory in a striped fashion, ingress logic associated with the entry ASIC of the frame determines the appropriate exit ASIC as discussed previously. Once the determination of the exit ASIC is made, a PUT message is sent to the exit ASIC, and a request to start transferring the frame from central memory may be made by the exit ASIC. This request may comprise sending a read address to a back-end ASIC from the exit ASIC. Egress logic associated with the exit ASIC may utilize the SOF offset and send the read address to the appropriate back-end ASIC. When the read address is received by the back-end ASIC, the corresponding data is sent through a downlink to the port that sent the read address in the form of read data.

FIG. 6 represents a block diagram of a time slot manager 600 associated with a front-end ASIC. Each front-end ASIC may possess a separate time slot manager 600. The time slot manager 600 comprises five functional elements. The first element that is responsible for controlling data flow into the switch is the ingress data path 602. The second element responsible for controlling data flow out of the switch is the egress data path 604. Egress data path 604 and ingress data path 602 are responsible for performing the duties (e.g. sending and receiving the intra-switch messages) as previously discussed. Each data path contains the control signals and logic necessary to perform its respective functions. The third and fourth elements of the time slot manager are uplink time slot multiplexer 606 and downlink time slot multiplexer 608. As previously discussed, the eleven uplinks 610 and eleven downlinks 612 physically take the form of eleven internal links. Uplinks 610 and downlinks 612 are separated in time slot manager 600 for viewing purposes. In addition, the eight external ports associated with each front-end ASIC are shown as incoming external ports 614 and outgoing external ports 616 for viewing purposes.

Time slot multiplexer 606 comprises a set of eleven multiplexers. Each multiplexer selects one of the receive data slots 622 and receive address slots 620 associated with a front-end ASIC and outputs to the associated uplink 610. Each one of the eleven uplinks has an associated multiplexer. This allows each uplink 610 to receive data from any of the receive data slots 622 and receive address slots 620.

The downlink time slot multiplexer 608 comprises a set of nine multiplexers. Each multiplexer selects one of eleven downlinks 612 associated with front-end ASIC and outputs to an outgoing external port 616. Each one of the eight outgoing external ports 616 has an associated multiplexer. In addition a multiplexer is utilized for the special memory transfer already discussed This allows each external port 616 to receive data from any of the eleven downlinks 612.

The fifth element in the time slot manager 600 is a time slot control center 618 (TSCC). The TSCC 618 produces the signals required by the ingress data path 602, egress data path 604, and time slot multiplexers 606 and 608. Dynamic time slot selection utilizing the time slot manager 600 is discussed below.

For dynamic time slot selection, TSCC 618 may locate any downlink time slot that currently is assigned to a back-end ASIC with a chip offset and RAM group number identical to the SOF offset of the frame being requested. A read address then is sent through the identified uplink from the port requesting the frame. A dwell of frame data then appears on the corresponding downlink associated with the internal link.

The information the time slot manager 600 utilizes to dynamically assign time slots and carry out other time slot management functions is preferably carried out by control logic referred to as a "time slot control logic". The time slot control logic may function as a table that preferably is divided into 32 sub-tables, each sub-table associated with a front-end ASIC. This table associated with the time slot control logic may be referred to as the "control table." Time slot information for uplink and downlink time slots maybe stored in each sub-table of the control table in different sections. The control table may indicate the status (e.g. idle, active) and current position (i.e. which back-end ASIC) of each time slot. The time slot control center utilizes the SOF offset of the request and the time slot control logic to perform dynamic time slot selection. The time slot control logic preferably may be implemented via logical hardware (e.g. flip-flops and logic gates).

In addition to the time slot control logic, a set of microcode tables, referred to as a "time slot table," may be coupled to the back-end ASICs in switch 300. The time slot table may define the timing of specific data and address fields transferred on the internal links at a given time. The time slot table may determine when each word of data or address is written to or read from a back-end ASIC. Thus, different configuration of back-end and front-end ASIC for different sized switches may result in different time slot tables.

Referring now to FIG. 7, an exemplary layout of a control table associated with switch 300 is shown. The control table corresponds to a front-end ASIC in switch 300. The nine uplink and eleven downlink time slots are shown. Associated with each time slot is a status and position field. The status field may indicate whether a time slot is active or idle. Active status refers to time slot that are transferring data. Idle status refers to time slot that are present but are currently not transferring data. The position field may comprise the offset of the back-end ASIC the time slot is currently accessing. For example, downlink time slot TS2 is currently accessing back-end ASIC 324 in switch 300, the offset of this back-end ASIC (i.e. 9) is represented in the position field for this time slot. Accordingly, the control table stores the status and position of each time slot.

For dynamic assignment of downlink time slots, control logic in the TSCC 618 examines the current position of all downlink time slots. When the egress logic desires to transfer a frame, the egress logic determines the downlink that is connected to the back-end ASIC that contains the SOF. The egress logic then sends a request to the TSCC 618 for a timeslot beginning with that downlink. When an idle timeslot reaches that downlink, the timeslot is assigned to service that frame requested by the egress logic. The corresponding read address is sent on the determined uplink. For example, assume a request is made for a frame with a SOF offset in back-end ASIC 324 (i.e. offset 9) of switch 300. Further, assume the request for the frame came from an internal port of front-end ASIC 310. According to the control table in FIG. 7, TS2 is currently servicing back-end ASIC 324. TS3 is the next sequential time slot but is active, indicating that TS3 currently is transferring a frame. TS4, however, is idle. Therefore, if TS3 remains active and TS4 remains idle while it services back-end ASIC 324, TS3 may not be assigned to the request. TS4, however, since it is idle when it services back-end ASIC 324, may be assigned to the request.

In an alternative embodiment, the time slot manager may utilize various performance enhancements while performing dynamic time slot selection. One such enhancement is referred to as "frame pre-fetching". In switch 300, eleven downlink time slots are employed for only 8 external ports. In this exemplary case, the "extra" downlinks time slots may be better utilized by reading additional frame data associated with a request that currently is not being carried out due to another frame using the same port. When the port becomes free, the pre-fetched frame may be transmitted out on the appropriate port as previously described.

A second performance enhancement may be the capability to reassign time slots that are prefetching frames in order to fulfill higher priority requests. For example, if a time slot is currently prefetching a frame when a non-prefetch request arrives at the time slot manager, the prefetch time slot may be preempted and reassigned to the non-prefetch request. This may be accomplished by adding a field in the time slot table indicated the type of transfer the time slot is carrying out. If a non-pre-fetch transfer is requested and a pre-fetch transfer is currently assign to a time slot, the pre-fetch time slot may be assigned to the non-pre-fetch transfer request. The pre-fetch transfer may be held until another time slot becomes available. Thus, with this enhancement, pre-fetching may have a lower priority than normal transfers.

An additional configuration may use two sets of back-end ASICs for redundancy purposes. Data preferably may be written to both sets simultaneously and may be read from either set. Numerous performance enhancements, including having the capability to read one frame from one set of back-end ASICs and a second frame from the other set during the same time slot, may be devised.

Numerous variations and modifications will become apparent to those skilled in the art once the above disclosure is fully appreciated. It is intended that the following claims be interpreted to embrace all such variations and modifications

What is claimed is:

1. A switch that comprises:
    a plurality of front-end circuits that interface to ports through which frames are transmitted and received;
    a plurality of back-end circuits that store equal-sized frame portions in stripes; and
    internal links from each of the front-end circuits to each of the back-end circuits,
    wherein the internal links have dynamically assigned time slots that are staggered in time between internal links from a given front-end circuit.

2. The switch of claim 1, wherein data that traverses the internal links from a front-end circuit to a back-end circuit comprises a read address.

3. The switch of claim 1, wherein data that traverses the internal links from a front-end circuit to a back-end circuit comprises a write address.

4. The switch of claim 1, wherein data that traverses the internal links from a front-end circuit to a back-end circuit comprises write data.

5. The switch of claim 1, wherein data that traverses the internal links from a back-end circuit to a front-end circuit comprises read data.

6. The switch of claim 1, wherein each of the front-end circuits includes a time slot manager configured to maintain a table of time slot allocations for frame transfers to the front-end circuit from one or more of the back-end circuits, wherein the table indicates which time slots are available for allocation, and wherein the time slot manager allocates time slots based on first-available time slots.

7. The switch of claim 6, wherein frame portions from a given port are allocated a predetermined time slot for transfer across the links to the plurality of back-end circuits.

8. The switch of claim 1, wherein a frame may be transferred from one of the plurality of back-end circuits on an unused time slot not ordinarily assigned to the frame.

9. The switch of claim 1, wherein an unused time slot is utilized by a frame waiting in a transfer queue.

10. The switch of claim 1, wherein a time slot is reassigned to fulfill a higher priority transfer.

11. The switch of claim 1, wherein each of the plurality of back-end circuits is logically divided into multiple back-end circuits.

12. The switch of claim 1, wherein data is stored on the multiple back-end circuits in a redundant fashion.

13. The switch of claim 1, wherein the time slots transfer data types selected from the group consisting of read addresses, write addresses, frame data, and a combination thereof.

14. The switch of claim 13 wherein the data types are transferred on an internal link in a defined pattern.

15. A method comprising:
receiving equal-sized portions of a frame;
storing the portions in one or more buffer lines that span multiple memory modules;
dynamically allocating to the portions a time slot on multiple internal links that couple the memory modules to an egress port; and
transferring the equal-sized portions to an egress port using a dynamically allocated time slot.

16. The method of claim 15 wherein the receiving equal-sized portions further comprises obtaining a statically assigned time slot.

17. The method of claim 15, wherein the receiving equal-sized portions further comprises sending a write address on at least one of the multiple internal links to store a portion of a frame.

18. The method of claim 15, wherein the receiving equal-sized portions further comprises converting the portion into write data.

19. The method of claim 15, wherein the transferring the equal-sized portions further comprises converting data stored in the memory modules to read data.

20. The method of claim 15, wherein the transferring the equal-sized portions further comprises sending a read address to the memory modules that store a portion of a frame that is desired to be read.

21. The method of claim 15, wherein said dynamically allocating includes:
maintaining at least one table of time slots on internal links;
using said at least one table to identify available time slots; and
allocating a first-available time slot from said table.

22. The method of claim 15, further comprising:
transferring the portion from an ingress port to the multiple memory modules using a predetermined time slot.

23. The method of claim 15, further comprising:
transferring the portion if the portion is in a queue from an ingress port to the multiple memory modules using a unused time slot.

24. The method of claim 15, wherein the predetermined time slot is a time slot allocated for all frames received via the ingress port.

25. The method of claim 15, wherein the allocating a first available time slot further comprises determining a priority for all frames to be transferred.

26. A Fibre Channel (FC) fabric comprising:
multiple FC switches coupled together,
wherein at least one of the FC switches is configured to receive equal-sized portions of a frame, store the portions in one or more buffer lines that span multiple memory modules, and dynamically allocate to the portions a time slot on multiple internal links that couple the memory modules to an egress port.

27. The fabric of claim 26, wherein the portions from a given port are allocated a predetermined time slot for transfer across the links to the multiple memory modules.

28. The fabric of claim 26, wherein a frame may be transferred from one of the multiple memory modules on an unused time slot not already assigned to the frame.

29. The fabric of claim 26, wherein an unused time slot is utilized by a frame waiting in a transfer queue.

30. The fabric of claim 26, wherein a time slot is reassigned to fulfill a higher priority transfer.

31. The fabric of claim 26, wherein at least one of the multiple memory modules is logically divided into multiple memory modules.

32. The fabric of claim 26, wherein data is stored on the multiple back-end circuits in a redundant fashion.

33. The fabric of claim 26, wherein the time slots transfer data types selected from the group consisting of read addresses, write addresses, frame data, and a combination thereof.

34. The fabric of claim 33, wherein the data types are transferred on an internal link in a defined pattern.

35. A network comprising:
at least two nodes; and
a Fibre Channel (FC) fabric coupling the nodes,
wherein the fabric comprises at least one switch that is configured to receive equal-sized portions of a frame, store the portions in one or more buffer lines that span multiple memory modules, and dynamically allocate to the portions a time slot on multiple internal links that couple the memory modules to an egress port.

36. The fabric of claim 35, wherein the portions from a given port are allocated a predetermined time slot for transfer across the links to the multiple memory modules.

37. The fabric of claim 35, wherein a frame may be transferred from one of the multiple memory modules on an unused time slot not already assigned to the frame.

38. The fabric of claim 35, wherein an unused time slot is utilized by a frame waiting in a transfer queue.

39. The fabric of claim 35, wherein a time slot is reassigned to fulfill a higher priority transfer.

40. The fabric of claim 35, wherein at least one of the multiple memory modules is logically divided into multiple memory modules.

41. The fabric of claim 35, wherein data is stored on the multiple back-end circuits in a redundant fashion.

42. The fabric of claim 35, wherein the time slots transfer data types selected from the group consisting of read addresses, write addresses, frame data, and a combination thereof.

43. The fabric of claim 42, wherein the data types are transferred on an internal link in a defined pattern.

* * * * *